United States Patent [19]
Bansal et al.

[11] Patent Number: 5,777,459
[45] Date of Patent: Jul. 7, 1998

[54] INDUCTION ELECTRICAL POWER GENERATING SYSTEM WITH VARIABLE NUMBERS OF POLES AND EXCITATION FREQUENCY

[75] Inventors: Madan Bansal; Gregory I. Rozman; Pierre Thollot, all of Rockford, Ill.

[73] Assignee: Sundstrand Corporation, Rockford, Ill.

[21] Appl. No.: 748,731

[22] Filed: Nov. 18, 1996

[51] Int. Cl.⁶ .................................................. H02P 9/00
[52] U.S. Cl. ............................ 322/47; 322/32; 290/40 B
[58] Field of Search ....................... 322/47, 32; 290/40 B

[56] References Cited

U.S. PATENT DOCUMENTS

| Re. 18,811 | 5/1933  | Alger .         |          |
|------------|---------|-----------------|----------|
| 1,752,871  | 4/1930  | Wieseman .      |          |
| 3,378,757  | 4/1968  | Potter          | 322/32   |
| 4,246,531  | 1/1981  | Jordan          | 322/28   |
| 4,357,542  | 11/1982 | Kirschbaum      | 290/44   |
| 4,812,730  | 3/1989  | Nakagawa et al. | 318/732  |
| 5,239,251  | 8/1993  | Lauw            | 318/767  |
| 5,281,905  | 1/1994  | Dhyanchand et al. | 322/32 |
| 5,483,435  | 1/1996  | Uchino          | 363/81   |
| 5,552,640  | 9/1996  | Sutton et al.   | 290/40 B |

FOREIGN PATENT DOCUMENTS

| 56-112892 | 11/1981 | Japan | 7/36 |
|-----------|---------|-------|------|
| 59-148597 | 8/1984  | Japan . | |
| 61-69399  | 4/1986  | Japan . | |

*Primary Examiner*—Steven L. Stephan
*Assistant Examiner*—Nicholas Ponomarenko
*Attorney, Agent, or Firm*—Antonelli, Terry, Stout & Kraus

[57] ABSTRACT

The invention is an induction electrical power generation system for generating alternating current varying within a frequency range; the system includes an induction electrical generator (52) for generating the alternating current having a rotor and a stator, the stator having at least one phase winding for outputting the generated alternating current and a plurality of poles with at least two different numbers of poles within the plurality of poles being selected to generate the alternating current, an exciter winding wound on the stator which is driven by AC excitation which varies in frequency during generation of the alternating current and the rotor operating with slip during the generation of the alternating current; a variable speed drive coupled to the rotor for driving the rotor in a speed range during generation of the alternating current; an exciter generator (54) coupled to the exciter winding for generating the variable frequency AC excitation; a speed sensor (56) for producing a signal which is a function of the speed of rotation of the rotor; and a controller (58), coupled to the inverter and responsive to the rotor speed signal, for commanding variation of the excitation frequency as a function of the rotor speed signal, a selection of the at least two different numbers of poles within the plurality of poles as a function of the rotor speed signal to control generation of the alternating current within the frequency range and a magnitude of excitation current produced by the exciter generator.

33 Claims, 4 Drawing Sheets

| ENGINE SPEED | N TO XN | XN TO $\frac{(S'+1)N}{2}$ | $\frac{(S'+1)N}{2}$ TO $\frac{X(S'+1)N}{2}$ | $\frac{X(S'+1)N}{2}$ TO S'N |
|---|---|---|---|---|
| # OF POLES | P | P | $\frac{2P}{(S'+1)}$ | $\frac{2P}{(S'+1)}$ |
| EXCITATION FREQUENCY | F TO XF | XF | F TO XF | XF |
| OUTPUT FREQUENCY | F TO XF | XF | F TO XF | XF |
| CONTROL | F&$I_M$ | $I_M$ | F&$I_M$ | $I_M$ |

WHERE $S'$ = $\frac{\text{MAXIMUM SPEED}}{\text{MINIMUM SPEED}}$

F = EXCITATION FREQUENCY $I_M$ = EXCITATION CONTROL

X = $\frac{\text{MAXIMUM FREQUENCY}}{\text{MINIMUM FREQUENCY}}$

INDUCTION ELECTRICAL POWER GENERATING SYSTEM WITH VARIABLE NUMBERS OF POLES AND EXCITATION FREQUENCY

TECHNICAL FIELD

The present invention relates to electrical power generating systems which produce variable frequency alternating current.

BACKGROUND ART

In a variable frequency electrical power system, a prime mover drives the rotor of a three phase alternator which produces output power which varies in frequency dependent upon the variation of the speed of the rotor. Such systems may be used on airframes to generate alternating current which is rectified into DC which provides power to a three phase inverter producing 400 Hz three phase output power. This type of a system is known in the aerospace industry as a variable speed constant frequency system (VSCF). VSCF systems are mechanically simpler than electrical power generating systems which utilize a power takeoff from a propulsion engine to drive a constant speed drive providing a constant speed shaft output which drives a three phase alternator at a synchronous speed to produce 400 Hz. alternating current. On the other hand, VSCF systems require inverters having a high output power rating which utilize solid state switches, such as IGBTs, which are rated to switch extremely high currents in order to produce the rated output power of the inverter.

The typical electrical load in an airframe includes substantial numbers of motor driven appliances which are capable of operating using a variable frequency alternating current power source which has a more limited frequency range than the alternating current which may be produced by a variable frequency generator driven by a power takeoff from a propulsion engine. Induction motors operate close to the synchronous speed and with an appropriate limitation on variation of frequency of the alternating current power source may be driven with alternating current which is not precisely regulated in frequency. Therefore, an alternating current generator which generates electrical power having a variation in frequency less than the variation in speed of a power takeoff from a propulsion engine may be used to drive a substantial number of electrical loads on an airframe if an appropriate power bus is provided. Reduction of variation in frequency results in the motors being reduced in size with the accompanying benefit of reduced weight.

Figure 1:
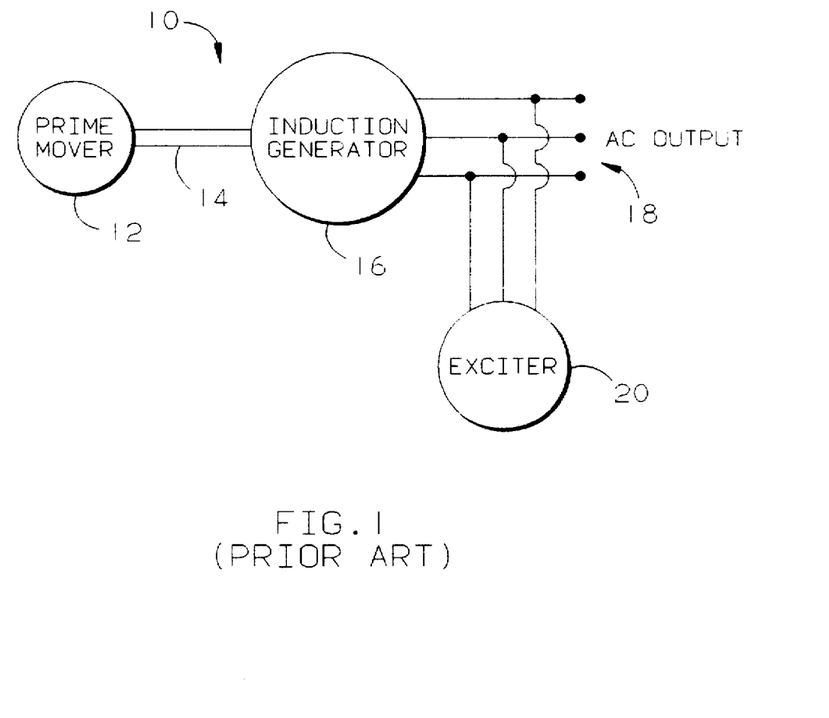
FIG. 1 is a diagram of a prior art induction generator of alternating current.

FIG. 1 is a block diagram of a prior art induction electrical power generating system 10 which utilizes a prime mover 12 having an output shaft 14 which drives an induction generator 16 which produces a three phase alternating current output 18. An exciter 20, which may be an inverter, applies alternating current excitation to the induction generator to create the required AC excitation for the stator windings which, in response to torque applied by shaft 14 to the rotor, which may be a squirrel cage rotor, produces the alternating current output 18.

As is well known, induction machines operate with a slip S defined by the equation $$S = \frac{N_S - N}{N_S}$$

which is the difference between the synchronous speed $N_S$ as defined by the equation $$N_S = \frac{120 f}{P}$$

where f is the frequency in hertz of the generated electrical power and p is the number of stator poles and N is the actual speed of the rotor. For generator operation, it is well known that the slip S must be negative. Furthermore, it is known that AC output power is inversely proportional to the frequency of the AC excitation provided to the exciter 20 for any given shaft rotational velocity. Therefore, an increase in the frequency of excitation during the generation of electrical power, with the shaft speed 14 being constant, will produce a commensurate decrease in the AC output power 18. Furthermore, it is known that the excitation current of the generator is varied in direct proportion to the electrical load to cause the excitation current to increase in response to an increased electrical load to increase the magnetic flux which results in an increase in generator voltage.

Furthermore, it is well known that the synchronous speed may be varied by providing mechanisms for choosing the number of stator poles which are active in the generation of electrical power. If the number of stator poles is switched in half, the synchronous speed $N_S$ doubles in accordance with the aforementioned equation.

DISCLOSURE OF INVENTION

The present invention is an electrical power generating system for generating alternating current varying within a frequency range and, preferably, is an induction-type generator. The frequency of the generated alternating current is controlled in response to a sensor which produces a signal representing the speed of the generator and selects a number of poles in the stator of the induction electrical power generator used during the generation of electrical power, varies the frequency of excitation of alternating current applied to the stator windings by an exciter generator which may be an inverter or other source of variable frequency alternating current excitation and the magnitude of the excitation current in response to changes in the electrical load. The exciter generator/inverter works as a controllable leading power factor load and supplies excitation current to the generator. The exciter generator/inverter also operates as an AC to DC converter. The DC output exciter generator/power is obtained from the inverter output. A controller switches the number of poles which are used in the generation of output power, the frequency of the AC excitation and the magnitude of the exciter current in response to variation in the electrical load. As a result, the controller controls the operation of the power generation system such that a difference between a highest frequency of generated alternating current subtracted from a lowest frequency of generated alternating current divided by the lowest frequency of generated current divided by a difference between a highest speed of the rotor during generation of the alternating current subtracted from a lowest speed of the rotor during generation of alternating current divided by the lowest speed of the rotor during generation of the alternating current is less than 1.

The controller, during generation of the alternating current, controls the magnitude of the excitation current in proportion to the electrical load and may, when the variable speed drive varies the speed of the rotor from a minimum speed to a maximum speed, cause an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causes an increase in the number of poles and a decrease in the excitation frequency followed by when the rotor reaches a third intermediate speed higher than the second intermediate speed causes an increase in the excitation frequency. Any number of intermediate points may be used to change the frequency of excitation and the number of poles to control the frequency range of generated alternating current throughout the speed range at which the rotor is driven.

The invention effectively compresses the dynamic variation in frequency of the output power produced by an electrical power generating system, such as an induction-type electrical power generator, below a range in variation of the rotor speed during power generation which would occur with normal induction power generation in which operation approaches synchronous operation. As a result, certain types of electrical loads, such as induction motors having reduced size and weight when compared to the motor size required when a greater range of frequency of electrical current is generated, which are prevalent on airframes, may be powered in accordance with the invention by controlling the generation frequency of the alternating current through the combination of the selection of the number of poles used during generation, variation of the excitation frequency and the magnitude of the excitation current without the attendant expense of either a constant speed drive or a VSCF electrical power generating system. The system of the present invention is less expensive than either constant speed drive systems or VSCF systems and may be used to generate a substantial quantity of electrical power consumed on an airframe because of the prevalence of induction motor loads. Furthermore, the use of an inverter as the preferred form of a variable frequency generator of excitation current may also produce surplus DC power for DC loads on an airframe depending upon the size of the inverter.

BEST MODE FOR CARRYING OUT THE INVENTION

Figure 2:
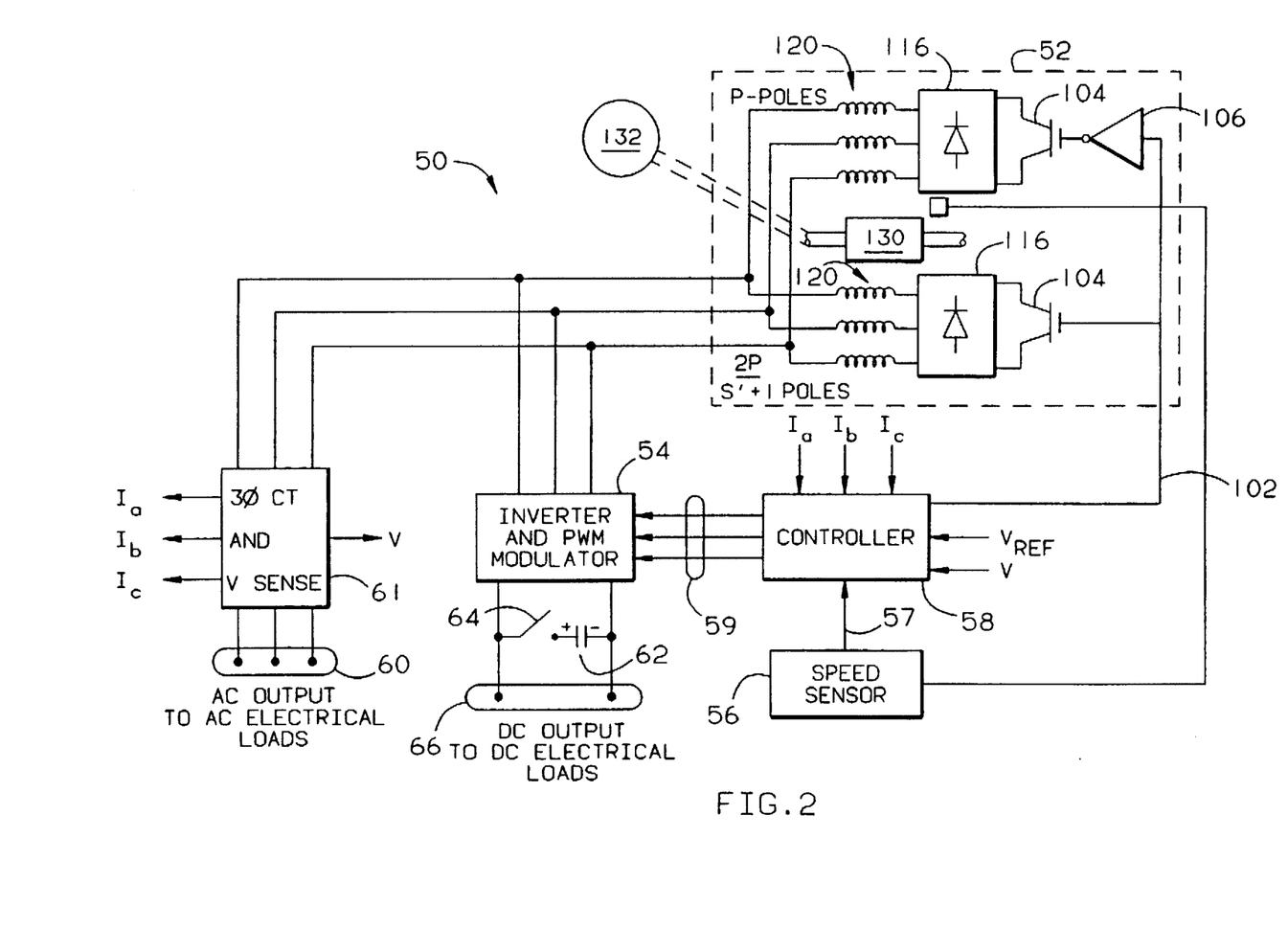
FIG. 2 is a block diagram of an induction type electrical power generating system for generating alternating current varying within a frequency range in accordance with the present invention.

The present invention is an induction electrical power generating system 50 for generating alternating current varying within a frequency range which is substantially compressed in comparison to the range of speed variation of the rotor 130. The frequency range in a preferred embodiment is selected to permit powering of electrical loads on an airframe such as prevalent induction motors which permits downsizing of the motors with the attendant benefit of reduced weight. As a result, unlike prior art electrical power generators on airframes which use either constant speed drive systems or VSCF systems, a simplified electrical power generating system is provided producing alternating current without the attendant mechanical complexity of a constant speed drive system or electrical complexity of the VSCF system. With the invention in the preferred field of application in an airframe, an AC bus coupled to the three-phase AC output 60 transmits the generated electrical power to the various loads in the airframe which do not require precise frequency regulated alternating current for operation.

The induction electrical power generating system 50 is comprised of a three phase induction generator 52 having a selectable number of poles, an exciter generator 54 which is preferably an inverter and PWM modulator, a speed sensor 56 which senses the shaft speed of the rotor 130 of the three phase induction generator 52 and a controller 58 which selects the number of poles which are selected for generating at least one and preferably, a three phase alternating current output 60, the variation of the excitation frequency produced by the inverter 54 as applied to the plurality of stator windings 120 contained within the induction generator 52 and the magnitude of the excitation current. The three phase current transformer and voltage sensor 61 sense the output current of each of the phases and the output voltage V which parameters are used along with the speed sensed by speed sensor 56 by the controller 58 to control operation during power generation. The control of excitation current in response to load variations involves generating a signal in response to output voltage fluctuations V which is compared to a desired reference voltage Vref. The difference, which is proportional to electrical load, is processed by the controller 58 to develop signals 59 which are applied by the controller 58 to the inverter and PWM modulator 54 to control the excitation current applied by the inverter 54 to the stator windings 120. The controller 58 further develops a signal on line 102 for selecting the number of poles which are used to generate electrical power by the multiple phase induction generator 52 as described below in conjunction with FIG. 4 as described below.

The frequency of the generated power is a function of rotor speed and slip. The rotor 120 may be of the squirrel cage type. Numerous methodologies exist for selecting a number of poles to be used for the generation of electrical power generation from a larger number of poles which are present in a stator of the electrical power generating system. The present invention may utilize any known mechanism for selecting the number of poles with the methodology for selecting the number of poles not being part of the present invention. The selection of the number of poles on the stator may be by using different windings or with electrical connections made with switches associated with one winding being utilized when the number of poles in the stator is selected during generation of electrical power generation.

The variable speed rotor drive 132 may be without limitation a power takeoff from a propulsion engine in an airframe but it should be understood that the present invention is not limited to any particular source of rotary power or limited to any particular speed range of rotation of the rotor 130.

The three phase induction generator 52 operates with a negative slip S in accordance with equation (1) above and the prior art to produce the three phase AC output 60. The control of the variable frequency excitation applied to the stator windings is chosen to limit the variation in frequency in the three phase AC output 60 such that a difference between a highest frequency of generated alternating current produced on the three phase AC output 60 subtracted from a lowest frequency of generated alternating current divided by the lowest frequency of generated alternating current divided by a difference between a highest speed of the rotor produced by the variable speed rotor drive during generation of the alternating current subtracted from a lowest speed of the rotor during generation of the alternating current divided by the lowest speed of the rotor during generation of the alternating current is less than 1 and may be less than 1:4. This relationship is maintained by sequentially at a series of increasing intermediate rotor speeds, first increasing the AC excitation frequency produced by inverter 54 followed by increasing the number of poles which are used to generate the three phase output 60 followed by decreasing the AC excitation frequency produced by the inverter 54 back to its original frequency at the lowest rotor speed while throughout the operational speed range varying the excitation current in response to electrical load changes. However, other sequences of changing of the frequency of the AC excitation produced by the inverter 54 and the selection of the number of poles during operation are possible.

In a preferred embodiment of the present invention, the induction electrical power generating system 50 is self-excited. In this circumstance, a battery 62 and a switch 64 may be used for initial powering of the inverter 54 during starting. The inverter 54 works as a controllable leading power factor load and supplies excitation current to the induction generator and operates as an AC to DC converter with DC power being obtained from the inverter output.

Figure 3:
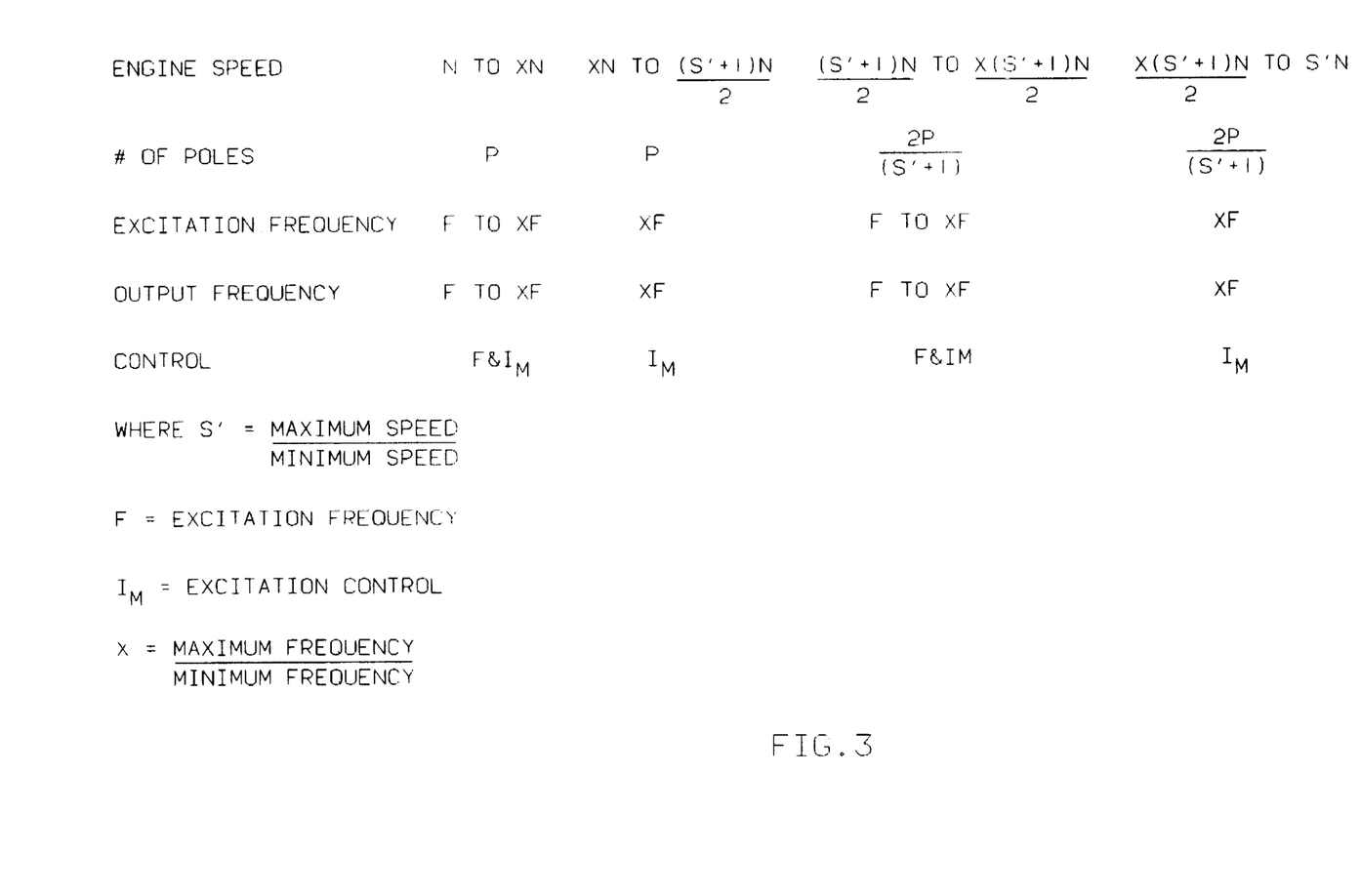
FIG. 3 is a table of operating conditions representing a particular control mode for generating alternating current in accordance with the present invention.

FIG. 3 is a table illustrating an example of the generation of alternating current with the present invention when the variable speed shaft drive drives the rotor through a speed range from N to S'N with S' being larger than one, e.g. two. The invention is not limited to this example. The parameters of control are excitation frequency F, excitation current $I_M$ which is changed in response to load current and speed variation and number of poles. Within this speed range there are three intermediate points which are $$XN,$$

$$\frac{(S'+1)N}{2}$$

$$\frac{X(S'+1)N}{2}$$

at which each point there is a change in either the excitation frequency which is in terms of a base excitation frequency F or the number of poles in which the base number of poles is equal to P with the number being changed to $$\frac{2P}{(S'+1)}$$

as described below to increase the synchronous speed. Between shaft speeds of N and $$\frac{(S'+1)N}{2}$$

the synchronous speed changes in proportion to the excitation frequency because the number of poles is $$\frac{(S'+1)N}{2}$$

and S'N the synchronous speed is increased as a consequence of the decreasing of the number of poles to $$\frac{2P}{(S'+1)}$$

In the first speed range between N and (S+-1)N/4, the number of poles is P, the excitation frequency is varied from F to XF, the output frequency varies between F and XF. The output voltage is controlled by excitation current. As the rotational shaft speed increases to (S'+1)N/2, the excitation frequency is kept constant at 1.25 F which results in the output frequency remaining constant at 1.25 F. The output power is controlled by the excitation current. At a second intermediate point, at (S'+1)N/2 the number of poles is decreased to $$\frac{2P}{(S'+1)}$$

However, at that same time, the excitation frequency is lowered by (X−1)F which has the effect of decreasing the output frequency by (X=1)F which results in the output frequency being equal to F. The output frequency increases between $$\frac{(S'+1)N}{2}$$

and $$\frac{X(S'+1)N}{2}$$

in direct proportion to the increase in shaft speed which in direct proportion to the increase in shaft speed which results in the output frequency being equal to X*F at $$\frac{X(S'+1)N}{2}$$

At a third intermediate point equal to $$\frac{X(S'+1)N}{2}$$

As the shaft speed increases from $$\frac{X(S'+1)N}{2}$$

to S'N, the output frequency is maintained constant by keeping the excitation frequency constant. The output power is controlled by controlling the excitation current to the 0.25N increase of the engine speed in terms of N.

Figure 4:
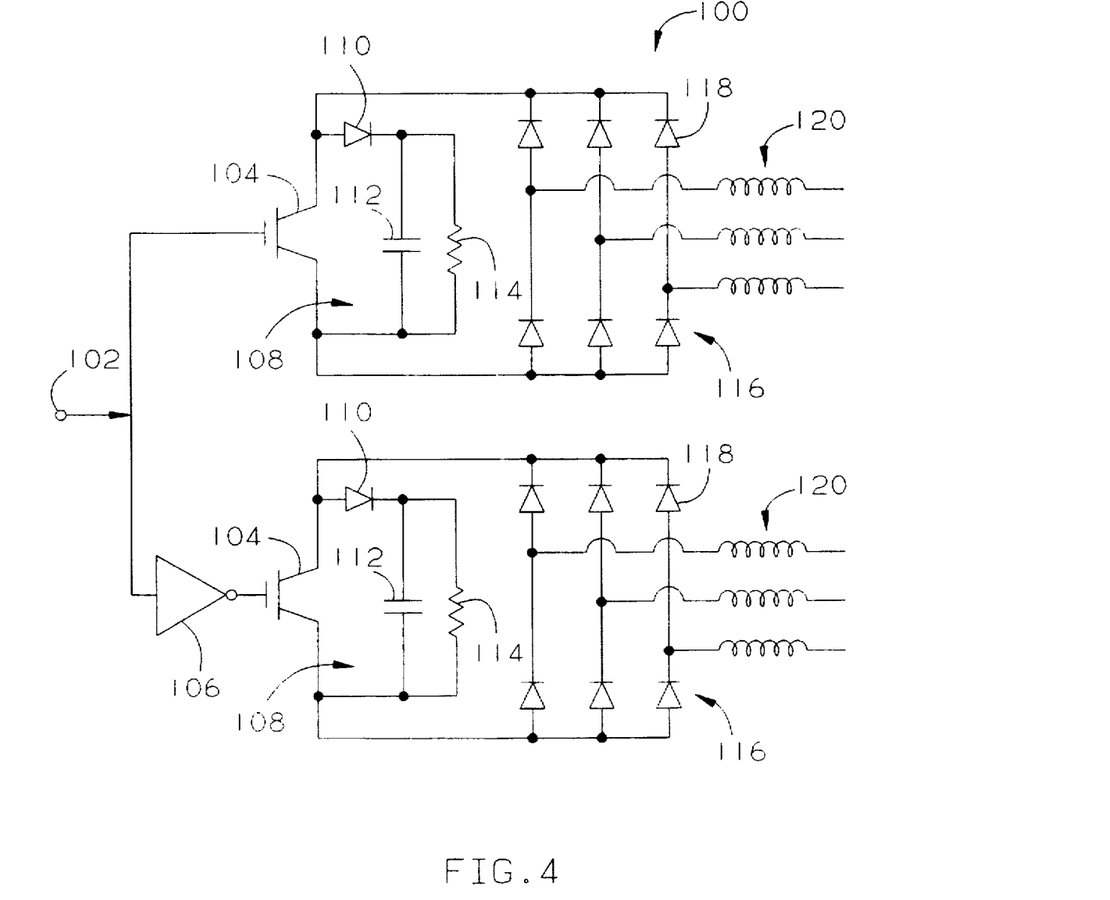
FIG. 4 is a block diagram of a suitable switching circuit for use in selecting the number of poles used in generating alternating current in accordance with the present invention.

FIG. 4 illustrates a suitable switching circuit 100 for use in selecting the number of poles used in the generation of alternating current in accordance with the present invention. Input 102 is connected to the output of controller 58 of FIG. 2. A pair of switching devices, such as IGBTs 104, are coupled to the input 102. The top IGBT 104 is connected directly to the input 104. The bottom IGBT 104 is connected through an inverter 106 to the input 102. When the input 102 is high, the top IGBT 104 is turned on and the bottom IGBT 104 is turned off as a result of the inversion produced by inverter 106. Alternatively, when the input 102 is low, the top IGBT 104 is turned off and the bottom IGBT 104 is turned on as a result of the low level input to inverter 106 being inverted on the output. Conventional snubbing circuits 108 comprised of a diode 110 connected in series with a parallel circuit comprised of capacitor 112 and resistance 114 function to reduce overvoltage spikes during turn off of the IGBTs 104. The output of each IGBT 104 is connected to a fullwave rectifier 116. Each fullwave rectifier is comprised of three pairs of diodes 118 which are connected in parallel across the output of an IGBT 104. Each output stator phase winding 120 is connected to the midpoint of a different pair of diodes 118. The top phase windings 120 are wound on a first number of poles on the stator and the bottom phase windings 120 are wound on a second number of poles on the stator winding. Alternatively, a single winding may be used with the number of poles being changed by making changes in connection using switches. In accordance with the example of FIG. 3, the top three phase stator windings 120 may be wound on two poles of the stator and the bottom three phase stator windings 120 may be wound on four poles of the stator. However, it should be understood that the number of poles that the top and bottom stator windings 120 are wound on is purely a matter of choice with regard to the pole selection which is desired for purposes of varying the synchronous speed of the generator. When an IGBT 104 is turned off, the stator windings 120 are disconnected from generating electrical current. On the other hand, when an IGBT 104 is turned on, a current path exists between the series connection of the diodes 118 which rectify each phase associated with a stator winding 120 to connect the windings together to provide an operational connection to the windings for generating three phase alternating current. It should be understood that the switching circuit of FIG. 4 is only one of numerous switching circuits which may be used to select the number of poles which are used to generate alternating current.

While the preferred embodiment of the present invention is in an induction type generator, it should be understood that the invention is also applicable to synchronous systems.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. An induction electrical power generation system for generating alternating current varying within a frequency range comprising:

an induction electrical generator for generating the alternating current and having a rotor and a stator, the stator having at least one phase winding for outputting the generated alternating current and a plurality of poles with at least two different numbers of poles within the plurality of poles being selected to generate the alternating current, an exciter winding which is driven by AC excitation which varies in frequency during generation of the alternating current and the rotor operating with slip during the generation of the alternating current, and wherein the rotor is driveably coupled to an external variable speed drive which drives the rotor in a speed range during generation of the alternating current;

an exciter generator coupled to the exciter winding for generating the variable frequency AC excitation;

an exciter generator coupled to the exciter for generating the variable frequency AC excitation;

a sensor for producing a signal which is a function of rotor speed; and a controller, coupled to the inverter and responsive to the signal, for commanding variation of the excitation frequency as a function of the signal, a selection of the at least two different numbers of poles within the plurality of poles as a function of the rotor speed signal to control generation of the alternating current within the frequency range and a magnitude of excitation current produced by the exciter generator.

2. A system in accordance with claim 1 wherein:

the exciter generator is an inverter; and during electrical power generation, the inverter receives alternating current from the at least one phase winding and rectifies the alternating current to produce direct current for generating the alternating current excitation and further outputs direct current electrical power.

3. A system in accordance with claim 1 wherein:

the exciter generator is an inverter; and a difference between a highest frequency of generated alternating current subtracted from a lowest frequency of generated alternating current divided by the lowest frequency of generated alternating current divided by a difference between a highest speed of the rotor during generation of the alternating current subtracted from a lowest speed of the rotor during generation of the alternating current divided by the lowest speed of the rotor during generation of the alternating current is less than one.

4. A system in accordance with claim 3 wherein:

the ratio is less than ¼.

5. A system in accordance with claim 2 wherein:

the exciter generator is an inverter; and a difference between a highest frequency of generated alternating current subtracted from a lowest frequency of generated alternating current divided by the lowest frequency of generated alternating current divided by a difference between a highest speed of the rotor during generation of the alternating current subtracted from a lowest speed of the rotor during generation of the alternating current divided by the lowest speed of the rotor during generation of the alternating current is less than one.

6. A system in accordance with claim 5 wherein:

the ratio is less than ¼.

7. A system in accordance with claim 1 wherein:

the exciter generator is an inverter; and the controller during generation of the alternating current when the variable speed drive varies the speed of the rotor from a minimum speed to a maximum speed causes an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causing an increase in the number of poles and a decrease in the excitation frequency.

8. A system in accordance with claim 7 wherein:

the controller when the rotor reaches a third intermediate speed higher than the second intermediate speed causes an increase in the excitation frequency.

9. A system in accordance with claim 7 wherein:

the controller further controls a magnitude of excitation current as a function of electrical load.

10. A system in accordance with claim 8 wherein:

the controller further controls a magnitude of excitation current as a function of electrical load.

11. A system in accordance with claim 2 wherein:

the exciter generator is an inverter; and the controller during generation of the alternating current when the variable speed drive varies the speed of the rotor from a minimum speed to a maximum speed causes an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causing an increase in the number of poles and a decrease in the excitation frequency.

12. A system in accordance with claim 11 wherein:

the controller when the rotor reaches a third intermediate speed higher than the second intermediate speed causes an increase in the excitation frequency.

13. A system in accordance with claim 11 wherein:

the controller further controls a magnitude of excitation current as a function of electrical load.

14. A system in accordance with claim 12 wherein:

the controller further controls a magnitude of excitation current as a function of electrical load.

15. A system in accordance with claim 3 wherein:

the exciter generator is an inverter; and the controller during generation of the alternating current when the variable speed drive varies the speed of the rotor from a minimum speed to a maximum speed causes an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causing an increase in the number of poles and a decrease in the excitation frequency.

16. A system in accordance with claim 15 wherein:

the controller when the rotor reaches a third intermediate speed higher than the second intermediate speed causes an increase in the excitation frequency.

17. A system in accordance with claim 15 wherein:

the controller further controls a magnitude of excitation current as a function of electrical load.

18. A system in accordance with claim 16 wherein:

the controller further controls a magnitude of excitation current as a function of electrical load.

19. A system in accordance with claim 4 wherein:

the exciter generator is an inverter; and the controller during generation of the alternating current when the variable speed drive varies the speed of the rotor from a minimum speed to a maximum speed causes an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causing an increase in the number of poles and a decrease in the excitation frequency.

20. A system in accordance with claim 19 wherein:

the controller when the rotor reaches a third intermediate speed higher than the second intermediate speed causes an increase in the excitation frequency.

21. A system in accordance with claim 19 wherein:

the controller further controls a magnitude of excitation current as a function of electrical load.

22. A system in accordance with claim 20 wherein:

the controller further controls a magnitude of excitation current as a function of electrical load.

23. A system in accordance with claim 5 wherein:

the exciter generator is an inverter; and the controller during generation of the alternating current when the variable speed drive varies the speed of the rotor from a minimum speed to a maximum speed causes an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causing an increase in the number of poles and a decrease in the excitation frequency.

24. A system in accordance with claim 23 wherein:

the controller when the rotor reaches a third intermediate speed higher than the second intermediate speed causes an increase in the excitation frequency.

25. A system in accordance with claim 23 wherein:

the controller further controls a magnitude of excitation current as a function of electrical load.

26. A system in accordance with claim 24 wherein:

the controller further controls a magnitude of excitation current as a function of electrical load.

27. A system in accordance with claim 6 wherein:

the exciter generator is an inverter; and the controller during generation of the alternating current when the variable speed drive varies the speed of the rotor from a minimum speed to a maximum speed causes an increase in the excitation frequency when the speed of the rotor reaches a first intermediate speed higher than the minimum speed and lower than the maximum speed of the rotor followed by when the rotor reaches a second intermediate speed higher than the first intermediate speed and lower than the maximum speed causing an increase in the number of poles and a decrease in the excitation frequency.

28. A system in accordance with claim 27 wherein:

the controller when the rotor reaches a third intermediate speed higher than the second intermediate speed causes an increase in the excitation frequency.

29. A system in accordance with claim 27 wherein:

the controller further controls a magnitude of excitation current as a function of electrical load.

30. A system in accordance with claim 28 wherein:

the controller further controls a magnitude of excitation current as a function of electrical load.

31. A system in accordance with claim 7 wherein:

the decrease in the excitation frequency lowers the excitation frequency back to a frequency of excitation when the rotor is being driven at the minimum speed.

32. A system in accordance with claim 31 wherein:

the controller further controls a magnitude of excitation current as a function of electrical load.

33. An electrical power generation system for generating alternating current varying within a frequency range comprising:

an electrical generator for generating the alternating current and having a rotor and a stator, the stator having at least one phase winding for outputting the generated alternating current and a plurality of poles with at least two different numbers of poles within the plurality of poles being selected to generate the alternating current, an exciter winding wound on the stator which is driven by AC excitation which varies in frequency during generation of the alternating current and the rotor operating synchronously during the generation of the alternating current, and wherein the rotor is driveably coupled to an external variable speed drive which drives the rotor in a speed range during generation of the alternating current;

an exciter generator coupled to the exciter winding for generating the variable frequency AC excitation;

a speed sensor for producing a signal which is a function of the speed of rotation of the rotor; and a controller, coupled to the inverter and responsive to the rotor speed signal, for commanding variation of the excitation frequency as a function of the rotor speed signal, a selection of the at least two different numbers of poles within the plurality of poles as a function of the rotor speed signal to control generation of the alternating current within the frequency range and a magnitude of excitation current produced by the exciter generator.

* * * * *